United States Patent [19]

Munk

[11] Patent Number: 4,793,137
[45] Date of Patent: Dec. 27, 1988

[54] CONTROL SYSTEM
[75] Inventor: Jeffrey R. Munk, London, England
[73] Assignee: Airship Industries (UK) Limited, London, England
[21] Appl. No.: 940,798
[22] Filed: Dec. 12, 1986
[30] Foreign Application Priority Data
Sep. 26, 1986 [GB] United Kingdom ................. 8623258
[51] Int. Cl.[4] ............................................. F16D 31/02
[52] U.S. Cl. ........................................ 60/390; 91/471
[58] Field of Search ..................... 60/388, 390; 91/47, 91/417 R, 527, 471

[56] References Cited
U.S. PATENT DOCUMENTS

| | | | |
|---|---|---|---|
| 2,893,204 | 7/1959 | Anderson et al. | 60/39.183 |
| 3,430,536 | 3/1969 | Oelrich | 91/47 |
| 3,589,242 | 6/1971 | Peterson et al. | 91/527 X |
| 4,508,014 | 4/1985 | Shoff | 91/527 |

Primary Examiner—Edward K. Look
Attorney, Agent, or Firm—Fulwider, Patton, Rieber, Lee & Utecht

[57] ABSTRACT

A control system for airships and the like that incorporates optically encoded control signals and a compressed fluid power source to power a remote control station to decrease the susceptibility of the control system to uninterruption or disablement due to electromagnetic interference. The compressed fluid power source provides means of driving an electrical generator at a remote location to power the electrical portion of the control system at the remote location in addition to providing primary power for movement of the controlled devices.

4 Claims, 1 Drawing Sheet

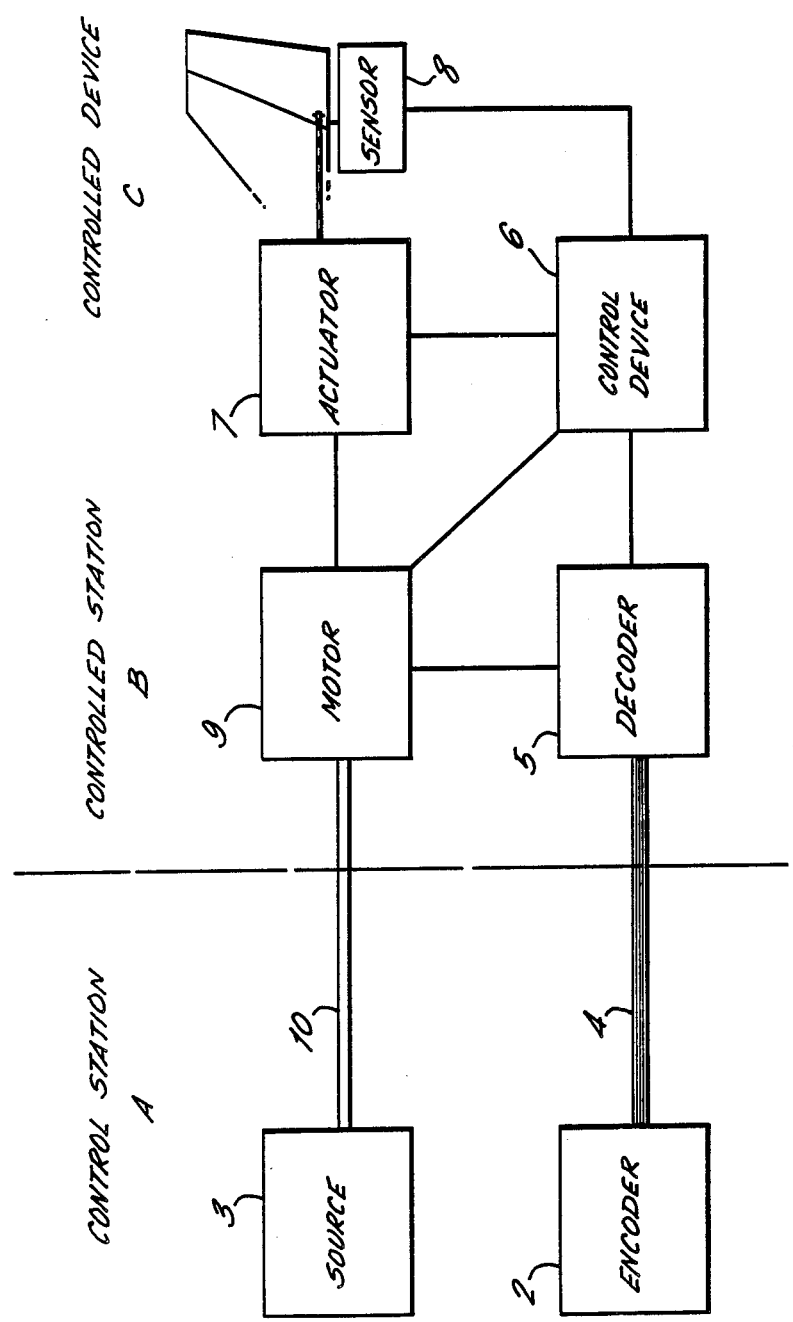

CONTROL SYSTEM

BACKGROUND OF THE INVENTION

1. Field of the Invention

This invention relates to a control system, and particularly to a control system in which control signals are transmitted from a control station to effect control of a device at a controlled station.

2. Description of the Related Art

Control systems are required for a variety of complex vehicles including, for example, an airship, where the control station would by the pilot's location and the device to be controlled would be an elevator or a rudder located on a part of the airship remote from the control station.

Such systems are known for use in aircraft in which the control signals are transmitted in the form of coded light pulse signals over an optical fibre connection between the control stations and the device to be controlled, such systems having the advantage that they are relatively immune from electrical interference from stray signals, radio interference or lightning.

However, in prior art systems, the electrical power require at the device to be controlled for decoding and use of the light pulse signals and possibly for operation of the controlled device is supplied over electrical cables, and such cables present a risk in relation to lightning strikes, this being a particular risk in the case of airships. Thus there remains a need for an airship control system that does not incorporate an electrical cable providing power to the device to be controlled.

SUMMARY OF THE INVENTION

According to the present invention there is provided a control system in which control signals are transmitted from a control station to effect a desired movement of a controlled device at a remote location, wherein electrical power required at the controlled device for interpretation of the control signals is generated at the controlled device by means of a motor driven by compressed fluid pumped to the motor from a central location.

The system of this invention has a particular advantage for airships in that it does not require the use of electrical cables, which present a risk in relation to lightning strikes, for the supply of necessary power to the controlled device.

Those skilled in the art will readily recognize that the invention provides an improved control system that has particular benefits and advantages to airships and the like in the presence of lightning, while providing the necessary control authority capabilities required to maneuver the vehicle. Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a block diagram of a control system according to the present invention, illustrating the relationship of the major components of the system.

DETAILED DESCRIPTION

This invention will now be described by way of example with reference to the drawing, which is a block schematic diagram of a control system according to the invention.

The system to be described is for use on an airship for control by a pilot at a control station A of a device C such as an elevator or rudder at a remote controlled station B.

The system comprises at the control station A an encoder 2 by which control signals entered by the pilot are encoded into a light pulse control signal, and a source 3 of compressed air, which can be a bleed from a gas turbine or a dedicated compressor.

The light pulse control signal is transmitted from the encoder 2 over an optical fibre connection 4 to a decoder 5 at the remote controlled station B where it is decoded and passed as an electrical control signal to a control device 6 which serves for control of the operation of the device C. The device C is operated by an actuator 7 which can be an electrical, pneumatic or hydraulic motor, under the control of the control device 6. A position sensor 8 or the like is associated with the device C, and supplies feed back signals to the control device 6 for use in control of the device C.

Electrical power for operation of the decoder 5, the control device 6 and the actuator 7, if such actuator uses an electric motor or a hydraulic motor controlled by electrical means, is obtained from a generator 9 which comprises a pneumatic motor driving an electrical generator. The pneumatic motor 9 is fed with compressed air from the source 3 at the control station A, the air being supplied through non-electrically conductive piping 10 extending between the station A and B. The pneumatic motor can be of the piston or vane type, or if the air supplied to the compressor is dry, a turbine.

The actuator 7 can be a pneumatic arrangement comprising a valve arrangement controlling an actuator, the combination of valve and actuator fed directly from the piping 10 and controlled by the control device 6; the generator 9 would still be required to provide electrical power for the decoder 5 and the control device 6.

The actuator 7 can be a hydraulic device driven directly by the pneumatic motor in the generator 9; here again the electrical generator in the generator 9 would still be required to provide electrical power for the decoder 5 and the control device 6.

From the above it may be seen that the present invention provides an important improvement in the technology of control systems, especially those adapted for use in airships and the like. While a particular form of the invention has been illustrated and described, those skilled in the art will recognize that various modifications can be made without departing from the spirit and scope of the invention. Accordingly, it is not intended that the invention be limited, except as by the appended claims.

I claim:

1. A control system in which control signals are transmitted from a control station to effect control of a device at a controlled station, the system comprising at the control station;
    a source of compressed fluid;
    a source of optical control signals;
    non-electrically conductive piping by which pressurized fluid from said source of compressed fluid is conveyed from the control station to the controlled station;
    an optical fiber conductor over which said optical control signals are transmitted from the control station to the controlled station;

at the controlled station, a motor driven by the pressurized fluid received from the control station over said piping and operative to drive an associated generator providing electrical power at the controlled station;

a decoder energized by electrical power from said generator and operative to convert said optical control signals into electrical control signals; and a control device energized by electrical power from said generator and responsive to said electrical control signals from said decoder to control an actuator which effects said control of said device at the controlled station.

2. A system as in claim 1, wherein said actuator at the controlled station is operated in accordance with said electrical control signals by electrical power from said generator.

3. A system as in claim 1, wherein the actuator at the controlled station is operated in accordance with said electrical control signals by the pressurized fluid supplied from the control station to the controlled station over said piping.

4. A system as in claim 1, wherein said pressurized fluid is air.

* * * * *